July 25, 1944.     I. L. STEIN     2,354,224

PROTECTIVE COVERING FOR ELECTRICAL OUTLET BOXES

Filed Nov. 13, 1940

INVENTOR
Irving L. Stein
BY
Orville N. Greene
ATTORNEY

Patented July 25, 1944

2,354,224

UNITED STATES PATENT OFFICE 2,354,224

PROTECTIVE COVERING FOR ELECTRICAL OUTLET BOXES

Irving L. Stein, Brooklyn, N. Y.

Application November 13, 1940, Serial No. 365,416

2 Claims. (Cl. 200—168)

My invention relates to protective devices for electrical outlet boxes and more particularly my invention relates to a temporary covering means containing means for actuating or permitting the actuation or testing of the electrical equipment contained in the outlet boxes.

In the normal construction of buildings, electrical outlet boxes are placed in the walls and ceilings of the building before the plastering and painting of the walls. These electrical outlet boxes at times contain only the grouped wires, but at other times the electrical outlet boxes contain switches, push buttons, receptacles, etc. During the course of the plastering and painting, the outlet boxes and their contents are often damaged or fouled by plaster or paint carelessly applied over or adjacent such outlet boxes. At times plaster and/or paint actually covers the outlet box and makes it difficult for the electrician to find such outlets for installation of fixtures subsequent to the plastering or painting.

It has been suggested to provide certain temporary covering means for such outlet boxes in the form of cardboard or paper covers and the like, but such temporary covers have proved unsatisfactory both because they do not have sufficient strength to withstand the striking blows of the plasterer's trowel and hence do not protect the wires or switches contained within the outlet box and also because of the rough and sometimes careless nature of the plastering operation, such paper and cardboard covers are torn and hence do not prevent the fouling of the contents of the box.

Further such temporary covers in the past had to be removed for testing of the switches or contents of the outlet box and because of their fragile nature this removal for testing often destroyed their effectiveness. After such removal, it was often found that the temporary covers were not replaced because of the difficulty of replacing them.

I have conceived of a novel construction for a temporary cover for such outlet boxes by means of which cover the outlet box's contents are completely protected against plaster and/or paint and also against any accidental mishandling. The outlet box of my invention is formed of a strong material such as metal and protrudes outwardly from the plane of the wall to be plastered or painted and hence the outlet box can be easily located after the plastering and painting. The metal cover is sufficiently strong to withstand the blows of the plasterer's trowel so as to prevent any injury to the contents of the box.

I further provide means located in and on the temporary cover for actuating or permitting the actuation or testing of the switch or other contents of the outlet box.

In one form of my invention I provide a sliding actuating member mounted in the temporary cover which permits the actuation of a switch contained in the outlet box, the actuating member engaging and propelling the switch itself upon external manipulation. In another form of my invention I provide in the outlet box a door which may be slidable in or hinged to the temporary cover to provide access to the contents of the outlet box.

I further provide in my temporary cover five screw openings in a vertical line so that the temporary cover can be applied to the empty outlet box or so that the temporary cover may be attached to the switch or gem box. I may also employ my protective cover when the outlet box contains any of the conventional electrical equipment such as switches, push buttons, receptacles or the like.

It is the object of my invention to provide a temporary cover for an electrical outlet box.

It is a further object of my invention to provide a novel temporary cover providing means for actuating a switch contained in the electrical outlet box.

It is a further object of my invention to provide a temporary rigid extending cover for an electrical outlet box containing a normally closed door for providing access to the contents of the outlet box.

It is a further object of my invention to provide a novel temporary cover for an electrical outlet box in which temporary cover is provided means for attaching such cover to an empty outlet box or an outlet box containing the various fixtures ordinarily placed therein, such as receptacles, switches, or push buttons.

It is a further object of my invention to provide a temporary cover for an electrical outlet box in which cover is provided a sliding door.

It is a further object of my invention to provide a novel protective cover for an electrical outlet box containing a spring hinged normally closed door by means of which access is provided to the box.

It is a further object of my invention to provide a novel protective cover for an electrical outlet box containing a spring hinged normally closed door by means of which access is provided to the box, which cover prevents fouling of the screw opening in the outlet box.

These and further objects of my invention will become apparent from a consideration of the drawing taken in connection with the specific description thereof which here follows.

Figure 1:
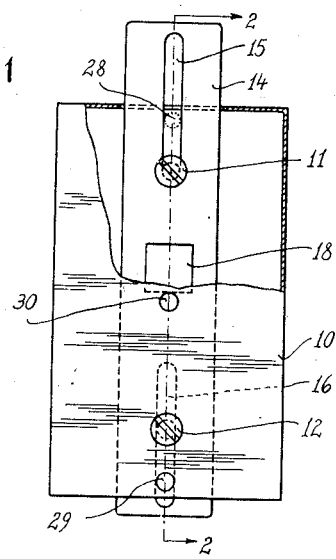
Figure 1 is a plan view in partial section of the protective temporary cover of my invention containing means for actuating a switch contained in the outlet box which it is desired to protect.

2—2 of Figure 1 showing the operation of my actuating means.

Figure 3:
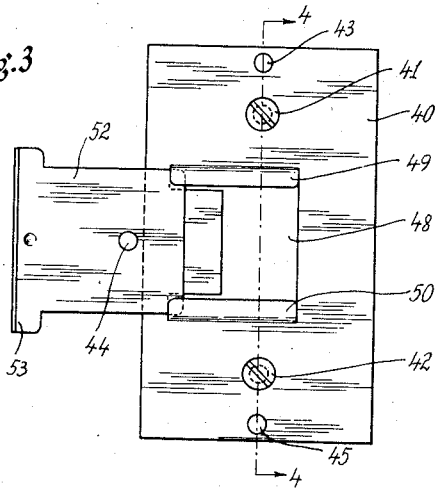

Figure 3 is a plan view of a modified form of my invention in which the protective cover contains a sliding door for providing access to the contents of the electrical outlet box.

Figure 4:
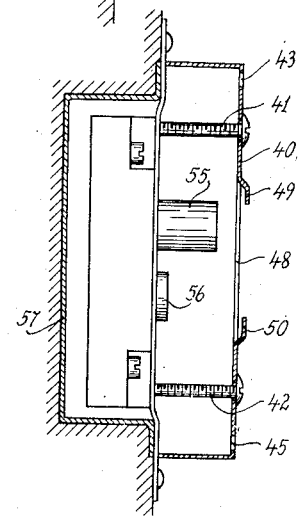

Figure 4 is a cross section taken along the line 3—3 showing the relative position of the temporary cover and the outlet box.

Figure 5:
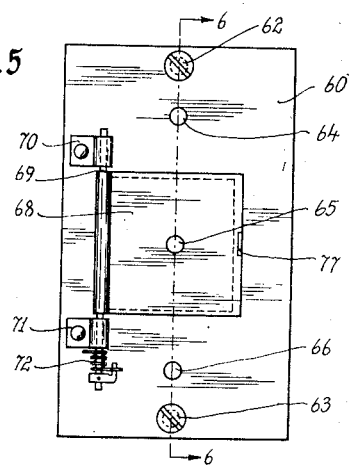

Figure 5 is a plan view of a still further form of my invention in which I show a temporary protective cover containing a hinged door for providing access to the contents of the electrical outlet box.

Figure 6:
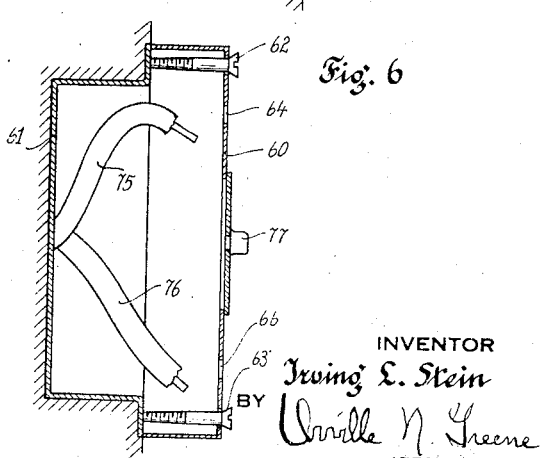

Figure 6 is a cross section taken along the line 6—6 of Figure 5.

Figure 2:
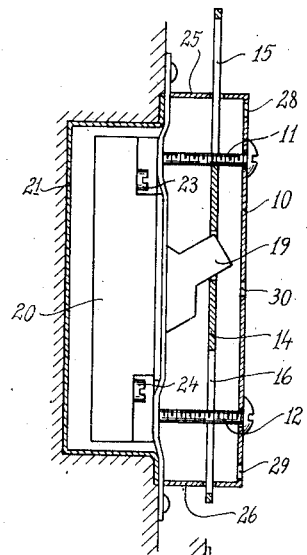
Figure 2 is a cross section taken along the line

Referring now more particularly to the drawing, in Figure 1 I show a temporary protective covering device 10 which is adapted to be secured to an electrical outlet box by means of screws 11 and 12, the cover 10 being made of sheet metal and may be formed by a stamping operation. Positioned in the cover 10 is an actuating arm 14 containing slots 15 and 16 which extend longitudinally at each end of said arm. Through the slots 15 and 16 the actuating arm 14 rides upon and is guided by the screws 11 and 12 as can be seen by reference to Figures 1 and 2. By riding on the screws 11 and 12, the path of travel of the actuating arm 14 is limited by the length of the slots 15 and 16. In the center of the actuating arm 14 is an opening 18 which is adapted to fit over the switch member 19. The switch member 19 is part of a switch 20 secured in the electrical outlet box 21 by means of the screws or bolts 23 and 24. The cover 10 completely protects the switch 20 located in the electrical outlet box 21 and prevents the entry thereinto or the fouling thereof by plaster, paint or any extraneous material.

Because of the extending side walls 25 and 26 of the cover 10 the outlet box may be readily located after the plastering and painting operation. Provided in the cover 10 are screw openings 28, 29 and 30. By means of these screw openings I can attach my cover device to the electrical outlet box in the event that the outlet box is empty or further in the event that a switch or plug-in receptacle has been placed in the outlet box in lieu of the switch here shown.

The operation of my device is as follows:

When the protective cover 10 is attached to the outlet box by means of the screws 11 and 12 the actuating arm 14 is so positioned that the opening 18 therein is superimposed over the switch arm 19. When the attaching screws 11 and 12 are properly tightened to secure the protective cover 10 over the outlet box 21, the switch arm 19 protrudes slightly outwardly in the opening 18 in the arm 14. By pressing down on the end of the actuating arm 14, the actuating arm is moved down causing the switch arm 19 to be thrown. Similarly the switch arm 19 can be thrown back by reversing the movement of the actuating arm 14.

In Figure 3 I show a protective cover 40 which is secured to the electrical outlet box by screws 41 and 42. Additional screw openings 43, 44, and 45 are provided for attachment of this cover to a variety of types of outlet box contents. In the cover 40 I provide an opening 46, the sides of which are raised edges 49 and 50 which are integral with the cover 40 and are formed by a stamping operation. These raised edges 49 and 50 provide a sliding engagement means for the sliding door 52 which terminates in a turned over edge 53 which edge is for the purpose of manipulating the sliding door.

As shown more clearly in Figure 4 when the door 52 is drawn back, access is afforded to the push buttons 55 and 56 which are suitably secured in the electrical outlet box 57. When the door 52 is closed as is normally its position, the contents of the electrical outlet box are completely protected. When access is desired into the box, the door 52 may be slid outwardly as is shown in Figure 3 by grasping the manipulating edge 53.

In Figure 5 I show a further modified form of my invention in which I provide a protective cover 60 secured to the outlet box 61 by the screws 62 and 63. Additional screw openings 64, 65 and 66 are provided on this cover so that the cover may be employed when the outlet box contains various types of fixtures. In the face of the outlet box is provided a door 68 which is mounted on a shaft 69 which shaft is in turn mounted in the bearing brackets 70 and 71. A suitable spring 72 maintains the door 68 against the cover 60 in its closed position. The door 68 can be however opened to provide access into the box for testing or inspection of the contents of the electrical outlet box 61.

In Figure 6 I show the outlet box containing wires 75 and 76 but it is to be understood that this outlet box can contain the various electrical elements shown above in Figures 2 and 4. On the door 68 I provide a tab 77 to permit the opening of the door against the action of the spring 72.

The protective cover of my invention as shown affords physical protection for the contents of the outlet box both against fouling and accidental or malicious damage, and further provides for the inspection and/or testing of the contents of the electrical outlet box without the removing of the protective cover therefrom.

A further feature of my invention relies on the all-around adaptability of my protective cover with different types of electrical elements contained in the outlet box.

I claim:

1. A temporary cover for an electrical outlet box comprising a rigid casing, rigid side walls downwardly extending from said casing, rigid end walls downwardly extending from said casing, slots disposed in said end walls of said casing, a sliding actuating arm having a central opening and a slot disposed longitudinally along said arm at each end of said arm, said arm being disposed in said end wall slots of said casing, openings in said casing, fastening means disposed in said openings, said sliding actuating arm being positioned to ride by means of said slots on said fastening means.

2. A temporary cover for an electrical outlet box comprising a rigid casing, rigid side walls downwardly extending from said casing, rigid end walls downwardly extending from said casing, slots disposed in said end walls, a sliding actuating arm disposed in said slots, an opening in said sliding actuating arm, said opening being adapted to engage a switch arm, screws securing said temporary cover to said electrical outlet box, said sliding actuating arm having two slots disposed longitudinally therein, said slots being adapted to engage and be guided by said screws.

IRVING L. STEIN.